US010019057B2

(12) United States Patent
Osman et al.

(10) Patent No.: US 10,019,057 B2
(45) Date of Patent: Jul. 10, 2018

(54) SWITCHING MODE OF OPERATION IN A HEAD MOUNTED DISPLAY

(71) Applicant: Sony Interactive Entertainment Inc., Tokyo (JP)

(72) Inventors: Steven Osman, San Mateo, CA (US); Xiadong Mao, San Mateo, CA (US); Jeffrey Roger Stafford, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/206,219

(22) Filed: Mar. 12, 2014

(65) Prior Publication Data

US 2014/0361976 A1  Dec. 11, 2014

Related U.S. Application Data

(60) Provisional application No. 61/832,758, filed on Jun. 7, 2013.

(51) Int. Cl.
*G02B 27/01* (2006.01)
*G06F 3/01* (2006.01)
(Continued)

(52) U.S. Cl.
CPC ......... *G06F 3/013* (2013.01); *G02B 27/0093* (2013.01); *G02B 27/017* (2013.01); *G02B 27/0172* (2013.01); *G02B 27/0179* (2013.01); *G06T 19/006* (2013.01); *G02B 2027/0187* (2013.01); *G06F 2203/04804* (2013.01)

(58) Field of Classification Search
CPC .......... G06F 3/011; G06F 3/012; G06F 3/013; G06F 3/015; G02B 27/0093; G06K 9/0221
See application file for complete search history.

(56) References Cited

U.S. PATENT DOCUMENTS

2002/0105482 A1   8/2002  Lemelson et al.
2010/0110368 A1   5/2010  Chaum
(Continued)

OTHER PUBLICATIONS

International Search—Form PCT/ISA/206 Communication relating to the results of the partial international search.

*Primary Examiner* — William Boddie
*Assistant Examiner* — Jeffrey A Parker
(74) *Attorney, Agent, or Firm* — Martine Penilla Group, LLP

(57) ABSTRACT

Methods, systems, and computer programs are presented for managing the display of images on a head mounted device (HMD). One method includes an operation for tracking the gaze of a user wearing the HMD, where the HMD is displaying a scene of a virtual world. In addition, the method includes an operation for detecting that the gaze of the user is fixed on a predetermined area for a predetermined amount of time. In response to the detecting, the method fades out a region of the display in the HMD, while maintaining the scene of the virtual world in an area of the display outside the region. Additionally, the method includes an operation for fading in a view of the real world in the region as if the HMD were transparent to the user while the user is looking through the region. The fading in of the view of the real world includes maintaining the scene of the virtual world outside the region.

21 Claims, 13 Drawing Sheets

(51) Int. Cl.
*G06T 19/00* (2011.01)
*G02B 27/00* (2006.01)

(56) References Cited

U.S. PATENT DOCUMENTS

| | | | |
|---|---|---|---|
| 2010/0115411 A1* | 5/2010 | Sorokin et al. | 715/723 |
| 2012/0050141 A1* | 3/2012 | Border et al. | 345/8 |
| 2012/0086624 A1* | 4/2012 | Thompson et al. | 345/8 |
| 2012/0200601 A1* | 8/2012 | Osterhout et al. | 345/633 |
| 2012/0243729 A1* | 9/2012 | Pasquero | 382/103 |

\* cited by examiner

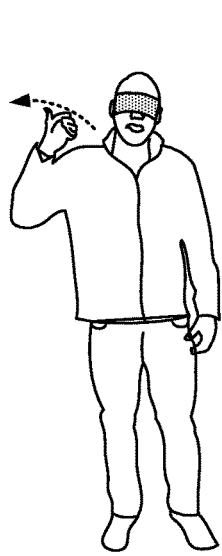 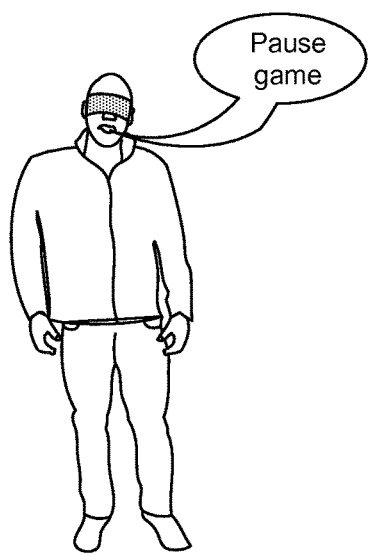
Fig. 9A     Fig. 9B
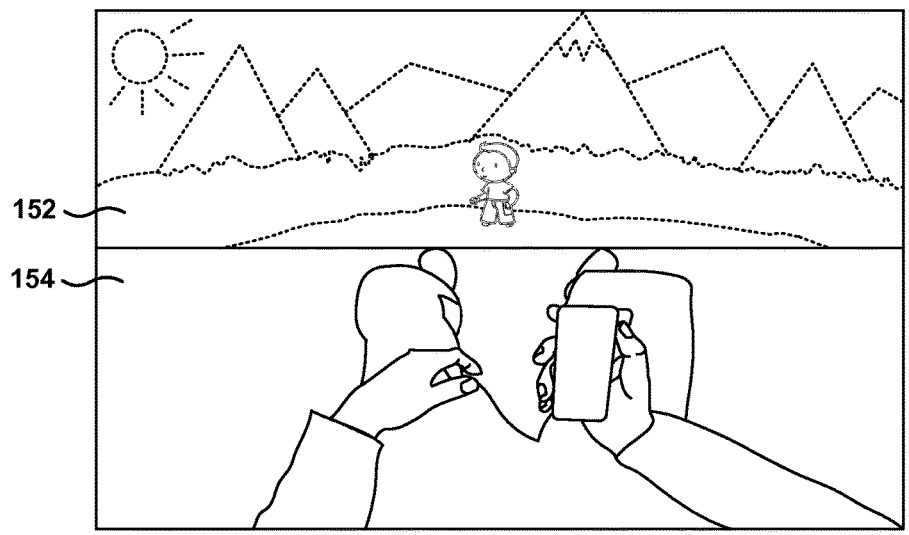
Fig. 10

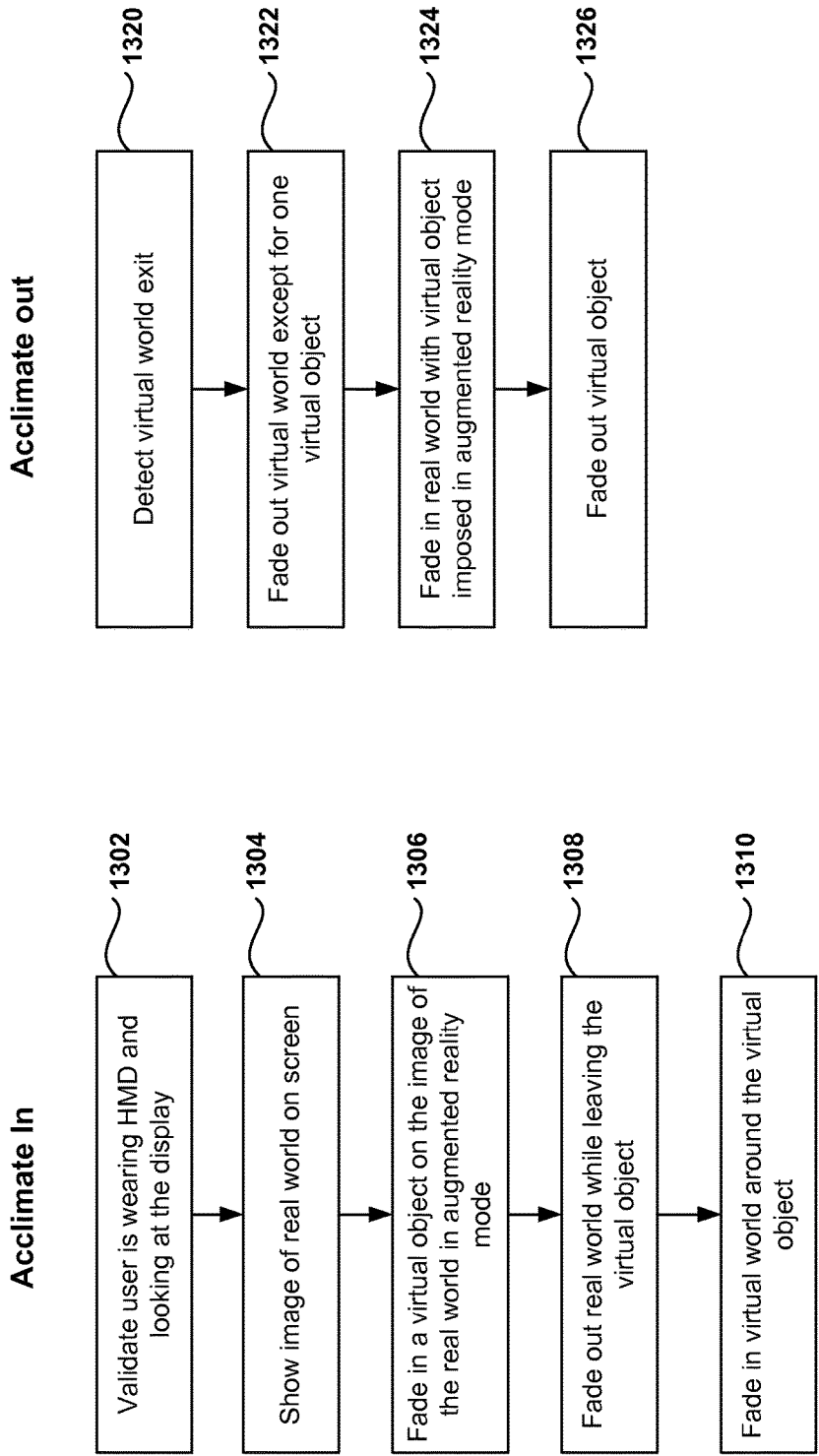

SWITCHING MODE OF OPERATION IN A HEAD MOUNTED DISPLAY

CLAIM OF PRIORITY

This application claims priority from U.S. Provisional Patent Application No. 61/832,758, filed Jun. 7, 2013, and entitled "SWITCHING MODE OF OPERATION IN A HEAD MOUNTED DISPLAY." This provisional application is herein incorporated by reference.

BACKGROUND

1. Field of the Invention

The present embodiments relate to methods for improving the usability of Head Mounted Devices (HMD), and more particularly, methods, systems, and computer programs for rendering images on the display within the HMD.

2. Description of the Related Art

Typically, an HMD is a portable device worn around the head of the user, such that a display situated a short distance from the eyes provides images for user interaction. Some HMDs provide a mixed real-life and virtual life environments, where the user is able to see images created by a computing device, as well as some real-live images. Other HMDs provide immersive experiences that block the outside world to the user, while providing a virtual world on the HMD display.

However, there can be problems while the user views the real world or the virtual world through the display in the HMD because the computing capability of the HMD may not be adequate to refresh images on the display. This can cause motion sickness or vertigo to HMD users. This phenomenon is especially critical, when the user is interrupted (e.g., receives a phone call) and the user wants to leave the HMD environment fast.

What is needed is an HMD that allows the user to interface with the real world quickly if an event requires the quick attention of the user.

It is in this context that embodiments arise.

SUMMARY

Methods, devices, systems, and computer programs are presented for managing the display of images on a head mounted device (HMD). It should be appreciated that the present embodiments can be implemented in numerous ways, such as a method, an apparatus, a system, a device, or a computer program on a computer readable medium. Several embodiments are described below.

In one embodiment, a method includes an operation for tracking the gaze of a user wearing the HMD, where the HMD is displaying a scene of a virtual world. In addition, the method includes an operation for detecting that the gaze of the user is fixed on a predetermined area for a predetermined amount of time. In response to the detecting, the method fades out a region of the display in the HMD, while maintaining the scene of the virtual world in an area of the display outside the region. Additionally, the method includes an operation for fading in a view of the real world in the region as if the HMD were transparent to the user while the user is looking through the region. The fading in of the real-world view includes maintaining the scene of the virtual world outside the region.

In another embodiment, a method for managing the display of images on a head mounted device (HMD) includes an operation for detecting a command to acclimate a user to the HMD. In addition, the method includes an operation for presenting a view of the real world on the display as if the HMD were transparent, and an operation for adding a virtual element to the view of the real world in augmented reality mode. Further yet, the method includes operations for fading out the real-world view from the display while maintaining the virtual element on the display, and for fading in a virtual-world view around the virtual element.

In yet another embodiment, a computer program embedded in a non-transitory computer-readable storage medium, when executed by one or more processors, for managing the display of images on a head mounted device (HMD), includes program instructions for tracking a gaze of a user wearing the HMD that is displaying a scene of a virtual world. The computer program further includes program instructions for tracking a gaze of a user wearing the HMD that is displaying a scene of a virtual world, and program instructions for detecting that the gaze of the user is fixed on a predetermined area for a predetermined amount of time. In addition, the computer program includes program instructions for fading out, in response to the detecting, a region of a display of the HMD while maintaining the scene of the virtual world in an area of the display outside the region. Further, the computer program includes program instructions for fading in a view of a real world in the region as if the HMD were transparent to the user while looking through the region, the fading in including maintaining the scene of the virtual world outside the region.

In yet another embodiment, a method for managing display of images on a head mounted device (HMD) includes an operation for tracking a gaze of the user as the gaze is projected on a display of the HMD. Further, the method includes an operation for identifying a trajectory of the gaze as the gaze is tracked. The identified trajectory is compared to a signature for the user, the signature including a signature trajectory for gaze. Furthermore, the method includes an operation for enabling access to a resource on the HMD when the identified trajectory corresponds to the signature trajectory.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIGS. 9A-9B illustrate inputs for transitioning out of the HMD environment, according to several embodiments.

FIG. 10 illustrates a mixed display with virtual world and real-life views, according to one embodiment.

FIG. 13A is a flowchart for acclimating in a user to the HMD, according to one embodiment.

FIG. 13B is a flowchart for acclimating out the user of the HMD, according to one embodiment.

DETAILED DESCRIPTION

The following embodiments describe methods, apparatus, systems, and computer programs for managing the display of images on a head mounted device (HMD). It will be apparent, that the present embodiments may be practiced without some or all of these specific details. In other instances, well known process operations have not been described in detail in order not to unnecessarily obscure the present embodiments.

Figure 1:
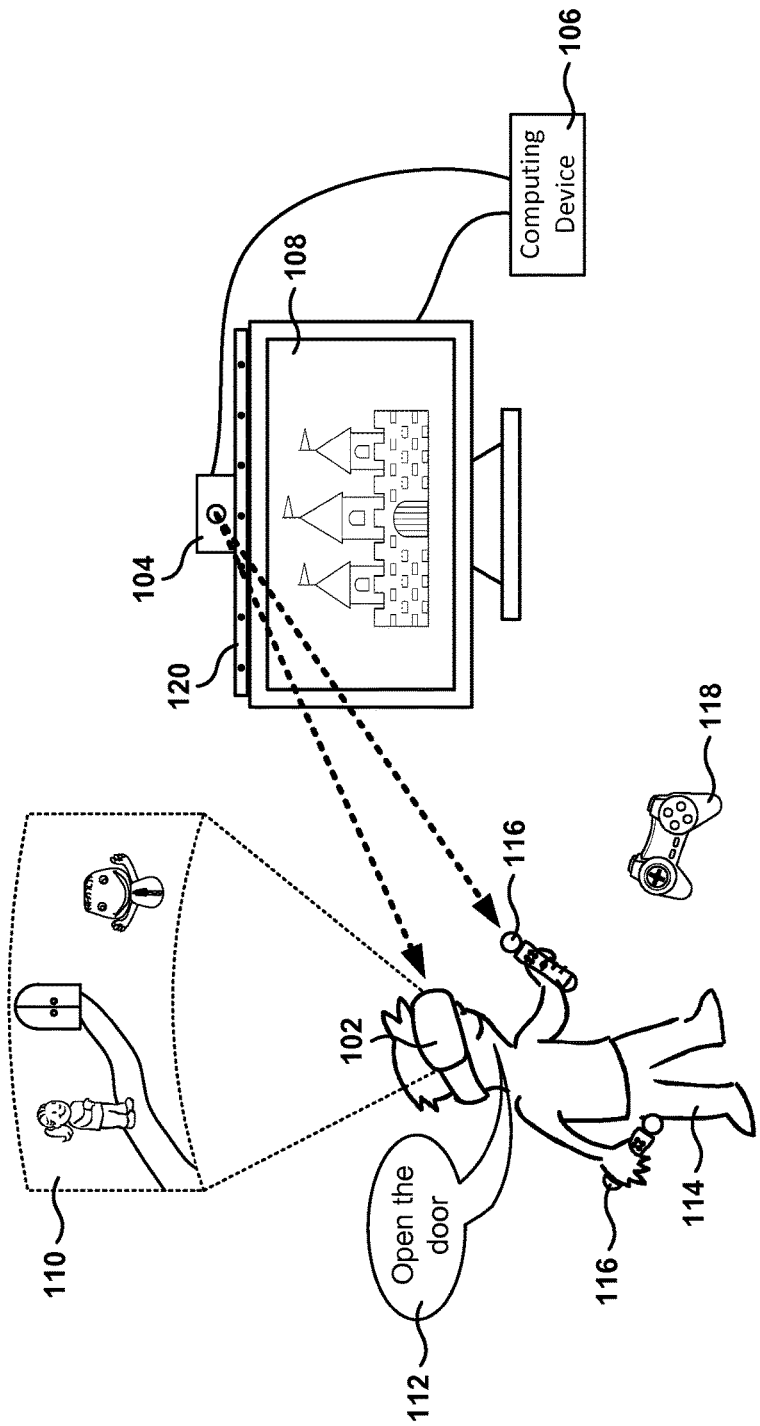
FIG. 1 illustrates a user interacting with a plurality of devices, including a Head Mounted Device (HMD), according to one embodiment.

FIG. 1 illustrates a user interacting with a plurality of devices, including a Head Mounted Device (HMD), according to one embodiment. User 114 is wearing HMD 102, which includes a display 110 that renders images near the eyes of the user. In one embodiment, the images are rendered in 3D.

In one embodiment, computing device 106 executes a game that is displayed on the HMD 102. Therefore, computing device 106 cooperates with HMD 102 to display images for playing the game. The processing of game operations may be done on the computing device 106, on the HMD 102, or in both computing device 106 and HMD 102.

In the embodiment of FIG. 1, HMD 102 communicates wirelessly (e.g., WiFi, Bluetooth, etc.) with computing device 106. In other embodiments (not shown), HMD 102 may be wired directly to computing device 106, or in communication with computing device 106 via a network (e.g., the Internet). For example, computing device 106 may be a server on a network that provides game services. In some embodiments, the HMD is an autonomous game playing device and the game is executed directly on the HMD, without the need of an external device to run the game.

In one embodiment, a camera (or cameras) is coupled to computing device 106. If the computing device 106 is a server on a network, camera 104 may be a networked camera that sends images to the computing device via the network (e.g., via the Internet). Camera 104 may be one or more of a regular image camera, a stereo camera (i.e., with two or more lenses that capture images from the playing area), an infrared camera, a depth camera, a 3D camera, etc.

Images taken with camera 104 may be processed to track the location and movement of HMD 102. In addition, the images may also be used to track the location and motion of the user or a feature of the user (e.g., head of the user, mouth of the user, hands of the user, torso of the user, etc.), of a controller (e.g., one-handed controller 116, two-hand controller 118), or of any other element in the play area.

In one embodiment, the user may provide commands via voice recognition, which may be performed by computing device 106 via sound capture through one or more microphones 120, or may be performed by HMD 102 which also includes, in one embodiment, one or more microphones. In another embodiment, user 114 may also enter inputs via gestures that are analyzed and recognized by computing device 106.

In one embodiment, the computing device 106 is also connected to a display 108, which may perform some game operations. For example, display 108 may provide instructions to the user before the user puts on the HMD 102. In another embodiment, display 108 provides the same, or similar, display shown on the HMD so other players in the vicinity may perceive the progress of the user 114 on the game displayed on the HMD 102.

In one embodiment, the user holds one or more controllers 116. The computer device 106 tracks the location and movement of the controller, and operations related to the motion of the controller, or inputs entered with the controller, may be used as inputs for the game. For example, the controller may represent the handle of a sword, and the sword is displayed in the game scene. As the user moves the controller, the sword moves in the virtual world in synchronism with the controller. This way, the player is able to perform a fighting game operation where the sword is the weapon.

In one embodiment, the computing device 106 calculates a relative position between the HMD 102 and the game controller 116. The relative position is then used by the game to move a game object in synchronism with the HMD 102.

The computing device may also track a second controller 116, that may also be linked to a game object that is rendered on the display of the HMD. For example, the second controller may be a shield, and the user is able to fight with the sword and the shield in the virtual world. In other embodiments, the controller may be used in the game for other purposes, such as a weapon (e.g., a gun, a rifle or any type of firing weapon, an axe, a laser gun, a steering device—a steering wheel or handles of a motorcycle—a flashlight, a hammer, a shield, etc.

In another embodiment, the user may also interact with a two-handed controller, which may be used in similar fashion as the one-hand controller. For example, the two-handed controller may be used as a steering wheel.

In another embodiment, the inputs entered with the controller, such as by pressing buttons on the controller, may be used to perform commands in the game. For example, the user may use the buttons on the controller to move an avatar in the game, to fire a weapon, to grab an object, etc.

It is noted that the embodiments illustrated in FIG. 1 are exemplary. Other embodiments may utilize different devices, a different number of devices, have more or less interaction between the different devices, use other ways of communication (e.g. ultrasonic), facilitate a multiplayer game with two users wearing respective HMD's play the same game, etc. The embodiments illustrated in FIG. 1 should therefore not be interpreted to be exclusive or limiting, but rather exemplary or illustrative.

Figure 2:
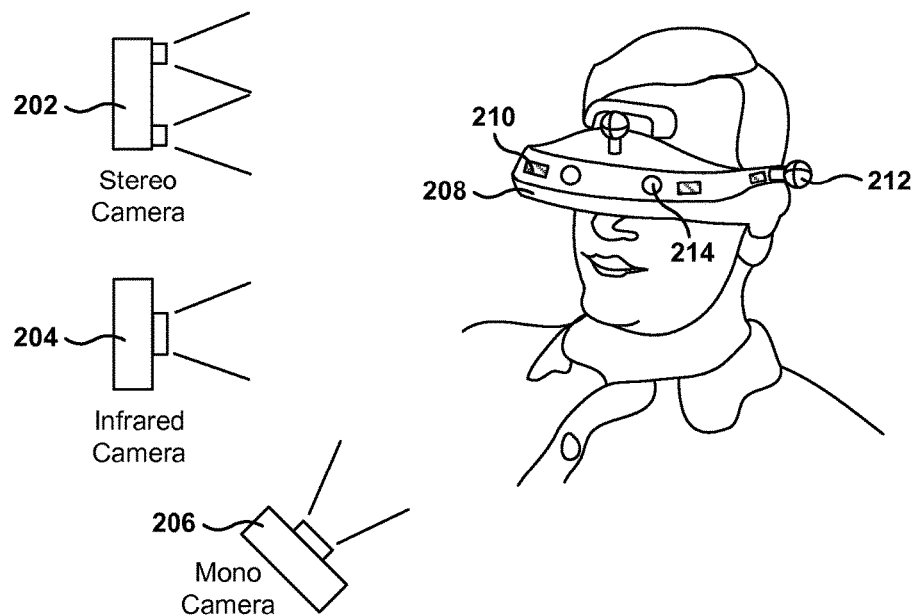
FIG. 2 illustrates the tracking of the HMD via image analysis, according to one embodiment.

FIG. 2 illustrates the tracking of the HMD via image analysis, according to one embodiment. In one embodiment, the HMD 208 includes elements that assist in the visual tracking of the HMD. For example, the HMD may include infrared lights 210, Light-Emitting Diodes (LED) 214, and objects with a special shape that is easily recognized via image analysis. For example, one or more spherical objects 212 may be added to the HMD for easy tracking. In addition, the spherical objects 202 may also be illuminated with LED light, infrared light, or any other type of illumination.

In addition, the HMD 208 may also include special visual markers (not shown), such as retro-reflective areas, areas with a particular color (e.g., blue rectangle, etc.), or markings (e.g., three parallel lines on the surface of the HMD), etc.

In some embodiments, the HMD includes lights or markers in the back of the HMD (i.e., the part of the HMD touching the back of the head). This way, if the user turns around and offers his back to the camera, it is still possible to visually track the location of the HMD by detecting the lights or markers in the back of the HMD.

The visual tracking of the HMD may be performed with different types of cameras. In one embodiment, the HMD is tracked with a stereo camera 202, which is a camera that includes two or more lenses. Images from the different lenses are compared in order to perform triangulation analysis of features in the HMD to assist in the location of the HMD, as well as in the calculation of the depth within the field of play of the HMD (e.g., distance from the HMD to the camera taking the pictures of the HMD).

In another embodiment, an infrared camera 204 analyzes infrared light (e.g., infrared lights 210). The infrared light is not visible to the human eye, but the infrared light is visible to the infrared camera. This way, the HMD may include infrared lights that do not detract from the appearance of the HMD. Additionally, in some environments (e.g., low light or bright light), it may be easier to track infrared light than other type of lights.

In yet another embodiment, a regular camera, also referred to herein as a mono camera because the camera has only one lens, is used to track the lights or features in the HMD. In order to determine the depth of the HMD within the field of play with the regular camera, the size of some of the features on the HMD are analyzed in order to detect the depth. The smaller the features are, the further away from the camera the HMD is. In addition, the tracking may also be combined with other types of tracking, such as inertial motion tracking, dead reckoning, ultrasound communication between the HMD in the computing device, etc.

It is noted that the embodiments illustrated in FIG. 2 are exemplary. Other embodiments may utilize different only one type of camera, several cameras in the field of play, etc. The embodiments illustrated in FIG. 2 should therefore not be interpreted to be exclusive or limiting, but rather exemplary or illustrative.

Figure 3:
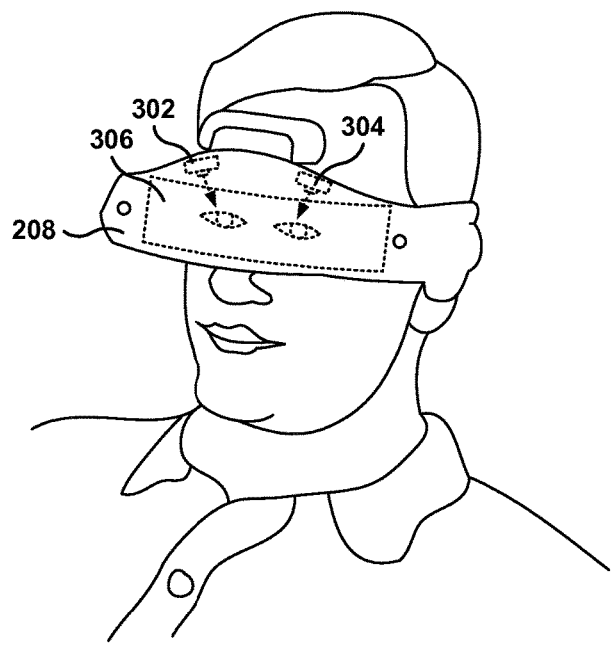
FIG. 3 shows an HMD with inside cameras for tracking the gaze of the user, according to one embodiment.

FIG. 3 shows an HMD with inside cameras 302, 304 for tracking the gaze of the user, according to one embodiment. In one embodiment, the HMD has one or more cameras (e.g. 302, 304) to track the gaze of the user, as the user is looking to the display 306 in HMD 208. In one embodiment, two cameras 302, 304, tracks the vision of the user, each camera tracking a different eye. In another embodiment, a single camera situated about the center of the HMD takes images of both eyes, and the images are analyzed to determine the gaze.

It is noted, that the embodiment of FIG. 3 includes cameras that are situated in front of the eyes, but the cameras may also be situated in different parts of the HMD. By using mirrors and filters, is possible to locate cameras for gaze tracking in multiple locations. For example, in one embodiment the camera may be situated behind the display, which lets the light go through in one direction (e.g., from the eye to the camera). In another embodiment, the camera may be situated on one side and aimed towards a mirror in the center of the HMD that redirects the vision of the camera towards the eyes.

Figure 4:
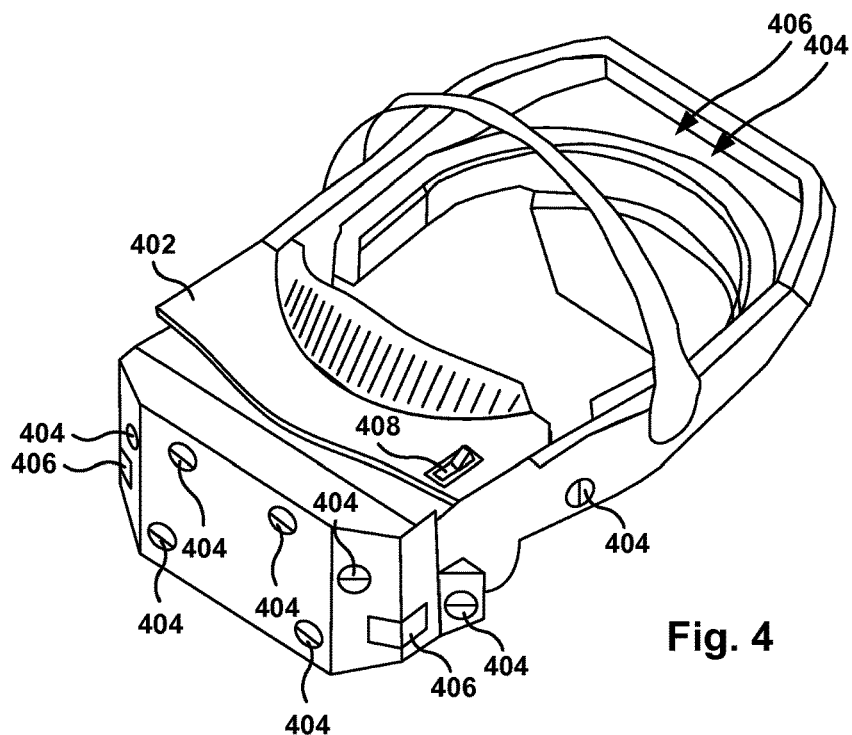
FIG. 4 shows an embodiment of an HMD with illumination points for visual tracking.

FIG. 4 shows an embodiment of an HMD with illumination points for visual tracking. FIG. 4 shows an HMD with a plurality of features that facilitate the tracking the motion of the HMD within the field of play. The HMD 402 includes infrared lights 404, which are situated in the front, sides, and back of the HMD.

The four infrared lights in the front of the HMD are situated on the same frontal plane of the HMD. In the embodiment of FIG. 4, the distance between the infrared lights of the top is a smaller than the distance between the infrared lights at the bottom. This way, the trapezoidal pattern formed by the infrared lights in the front facilitates the tracking of the HMD. For example, if the user tilts her head to one side, the trapezoid formed by the infrared lights in the front will be tilted the same angle as the head of the user.

In addition, three infrared lights on each side also assist with the tracking. Two of the side infrared lights are positioned at an angle between the front and the side of the HMD. Therefore, these two infrared lights may be seen by the camera when the camera is in front of the HMD or to the side of the HMD. Another infrared light on the side of the HMD is aimed towards the side of the head, or in other words, the infrared light is about 90° with reference to the infrared lights situated at the front of the HMD. Finally, an infrared light on the back of the HMD allows tracking of the HMD when the user is facing away from the camera.

As the user turns her head around, the infrared lights will form different patterns and the infrared lights will be perceived with different levels of brightness, based on the angle of view from the camera. These distances, size of the infrared lights, and levels of brightness, assist the computing device in the tracking of the location of the HMD.

In addition, the HMD includes three LED lights 406. There are two LED lights 406, situated at the front of the HMD, that have a cover that forms two intersecting planes. One of the planes is on the side of the HMD, and the other plane is at an angle (e.g., 45°) with reference to the front of the HMD. Similarly to the tracking of infrared lights, the computing device analyzes the shape and intensity of the LED light captured by the camera. This way, the computing device is able to determine the position of the HMD. Again, an LED light situated in the back of the HMD allows the camera to detect the HMD when the user is facing away from the camera.

Further, the HMD 402 includes a switch 408 to turn on or off the HMD. It is noted that the embodiments illustrated in FIG. 4 are exemplary. Other embodiments may utilize different only one type of lights, more than one type of lights, different layouts for the lights, a different number of lights, etc. The embodiments illustrated in FIG. 4 should therefore not be interpreted to be exclusive or limiting, but rather exemplary or illustrative.

Figure 5:
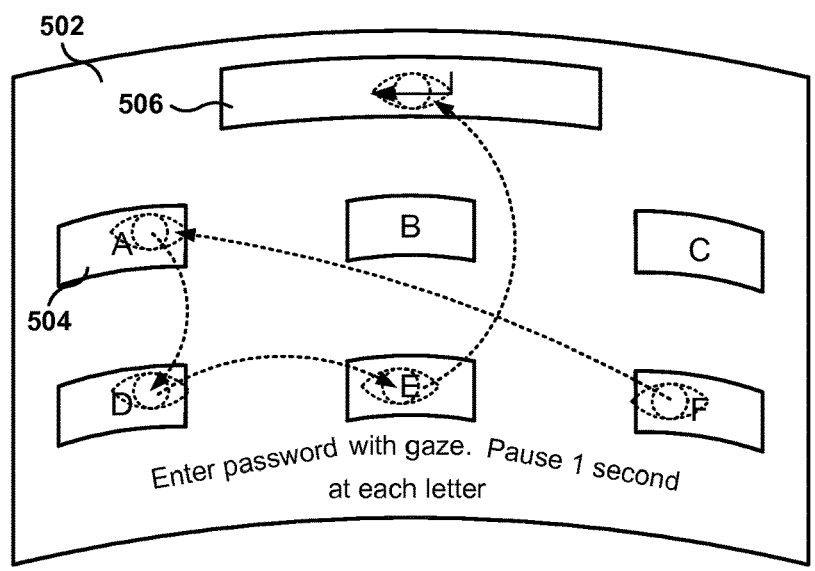
FIG. 5 illustrates the entry of a password with gaze, according to one embodiment.

FIG. 5 illustrates the entry of a password with gaze, according to one embodiment. In one embodiment, the user can be provided with information or instructions to follow with her gaze specific graphics on the head mounted display. If the user follows the correct graphics, the user creates a gaze pattern that may be used as input. The gaze input may be used for multiple purposes, such as to validate the user, to enter the game, to identify the user, to perform a selection of a game object, etc.

In one embodiment, gaze detection is used to enter a password, a name, an id, a command, etc. In one embodiment, a virtual keyboard (with all letters, digits, and symbols of a standard keyboard, or a subset thereof) is presented on the display. The user selects each character 504 by pausing her gaze on the desired character. Once the user pauses on the letter for a predetermined amount of time (e.g., 1 second, two seconds, etc.), then it is assumed that the user has selected that letter.

For example when entering a password, the user may select each of the letters of the password in order, and when all the letters are entered, the user selects a return button, or some other command, that signals that the password is ready for processing. As used herein, a password entered via gaze is also referred to as a "gazeword," a "passgaze," a "passlook," or a "gazepass." These terms may also be used when referring to the entry of a gaze signature, as described in more detail below with reference to FIG. 6.

In the exemplary embodiment of FIG. 5, the user enters the password "FADE" by selecting in order the letters F, A, D, and E. Afterwards, the user selects the enter key 506 to indicate that the system may process the entered password. In one embodiment, as the user selects each letter an indicator lets the user know that the letter has been entered. The indicator may be one or more of changing the color of the letter, flashing the letter, producing a sound (e.g., a beep), increasing a size of the letter, etc. In another embodiment (not shown) as the user enters each of the letters, the word being formed is displayed on another area of the display.

In one embodiment (not shown), a special area is provided in the display for the user to signal a transition from one letter to the next. This way, the user would enter via gaze a letter or a number, then move the gaze to the special area to input the selection, and then continue the process to select additional letters or numbers. In another embodiment, a backspace button is provided to allow the user to correct mistakes.

It is noted that the embodiments illustrated in FIG. 5 are exemplary. Other embodiments may utilize different types of virtual keyboards, include more letters and numbers, use special characters, use geometric figures for selection of parts of the geometric figures, etc. The embodiments illustrated in FIG. 5 should therefore not be interpreted to be exclusive or limiting, but rather exemplary or illustrative.

Figure 6A:
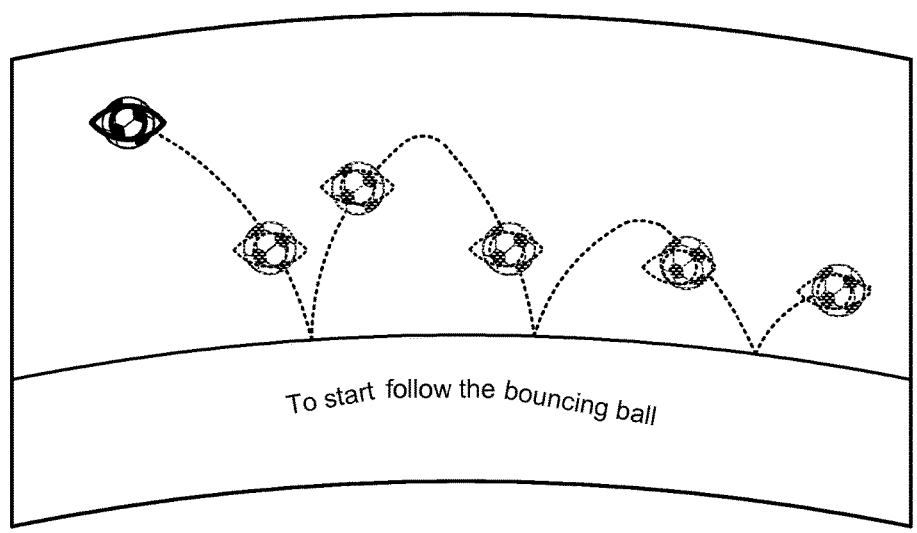
FIG. 6A illustrates a method for detecting when the user has started using the HMD, according to one embodiment.

FIG. 6A illustrates a method for detecting when a user has started using the HMD, according to one embodiment. Sometimes, if the HMD is already in operation, the HMD may be displaying complex graphics, such as 3-D graphics. If a user puts on the HMD without going through an acclimatization process, the user may get vertigo or dizziness. For example, a user that is playing a game takes off the HMD and passes the HMD to another player. If the HMD does not detect the transition, the second player may feel dizzy.

In one embodiment, the HMD tracks the gaze of the user. When a user takes off the HMD, the HMD detects that the gaze is no longer present and turns off the display or changes the display to a safe mode. When the user, or another user, puts on the HMD, the HMD detects the new user (e.g., by detecting the eyes of the new user) and initiates a process to validate that the user is ready to start.

In one embodiment, an object (e.g., a symbol, a word, a ball, etc.) is shown on the screen and the user is asked to follow the object with her gaze. As the user follows the object in its trajectory through the display, the HMD is able to validate how the gaze follows the object. This way, the HMD verifies that a human is looking at the display. Therefore, if the check is validated the HMD starts the acclimatization process to begin the display of more sophisticated graphics.

In one embodiment, following the object with the gaze does not have to be very accurate, as all is required is that there is some following of the object on the screen.

In another embodiment, the check may be used to detect users that may have difficulties using HMD's. If a user is not able to substantially follow the object on the screen, then the user may have difficulties adjusting to convert graphics that might require a good eye position with the capability to focus eyesight at different depths.

Figure 6B:
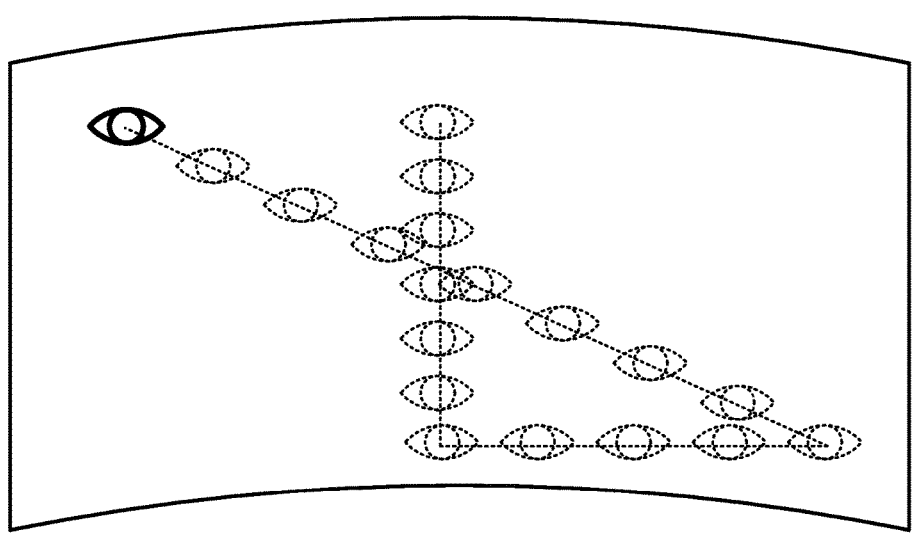
FIG. 6B illustrates the entry of a gaze signature, according to one embodiment.

FIG. 6B illustrates the entry of a gaze signature, according to one embodiment. In one embodiment, the trajectory of the gaze of the user is monitored in order to generate an input with the gaze. For example, the trajectory may be used to enter a password with gaze by following a predetermined pattern. When multiple users are configured for use in the HMD, the gaze pattern may be used to identify which user is wearing the HMD.

In some embodiments, the gaze pattern may also be used as a password, where the user may enter a gaze signature to access the system. The system provides an option to enter gaze patterns for new users.

In the exemplary embodiment of FIG. 6B, the gaze signature consists of three lines, a first line extending from the top left to the bottom right of the display, a second horizontal line going from the bottom right corner to the center of the display, and a vertical line going from the bottom of the display to the top of the display. If the user enters this gaze pattern, the user will be identified and allowed access to the system, in one embodiment.

In some embodiments, a pattern is displayed on the screen and the user is requested to follow the pattern. In the example of FIG. 6B, three lines would be drawn on the screen and the user would be asked to trace the three lines. This operation may be used for calibration purposes, or to verify that the user is able to follow patterns on the display of the HMD. The calibration may be used to calibrate the display, or to calibrate the gaze tracking system, or both.

In one embodiment, a method for managing display of images on a head mounted device (HMD) includes an operation for tracking a gaze of the user as the gaze is projected on a display of the HMD. Further, the method includes an operation for identifying a trajectory of the gaze as the gaze is tracked. The identified trajectory is compared to a signature for the user, the signature including a signature trajectory for gaze. Furthermore, the method includes an operation for enabling access to a resource on the HMD when the identified trajectory corresponds to the signature trajectory.

Figure 7A:
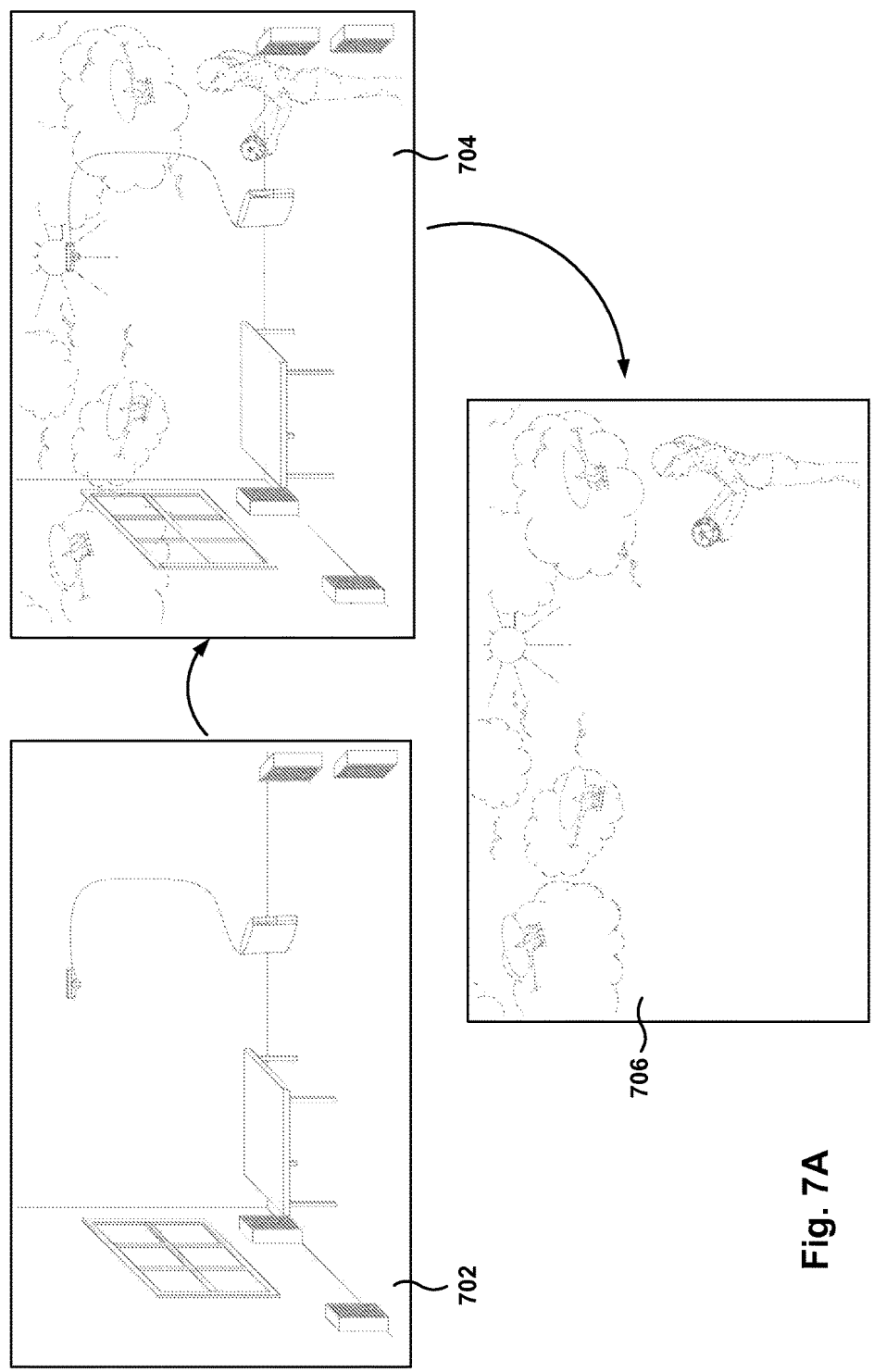
FIG. 7A illustrates a display transition from a real-life view to virtual world view, according to one embodiment.

FIG. 7A illustrates a display transition from a real-life view to a virtual-world view, according to one embodiment. Some embodiments provide for automatically transitioning into and out of scenes provided by the head mounted display.

As previously discussed, sometimes people get dizzy when using an HMD. One of the reasons is that the eye needs some time to adjust from normal real-life viewing, to the viewing mechanics required for observing the display on the HMD. In order to solve this problem, an acclimatization process is utilized to adapt the user's viewing when entering a virtual scene on the display. This process is referred to herein as to acclimate in the user.

Similarly, if the user takes off the HMD without acclimatization the user may suffer vertigo or dizziness. There is a reverse process to acclimate out the user in order to go from a virtual world view to a real world view. The opposite process to get the user out from using the HMD is referred to herein as to acclimate out the user. More details are provided below with reference to FIGS. 13A-13B regarding the acclimatization processes.

In one embodiment, the transition into a virtual world starts with the view of the real world 702 (e.g., a see-through view), followed by a gradual transition towards the virtual world, where the real world and the virtual world are overimposed 704. In order to accomplish this, the virtual world is gradually faded in and overimposed over the real world view. The result 704 is a view with real-world elements and virtual-world elements.

Then, the real world view is gradually faded out to leave only the view of the virtual world 706. The duration of the operations to fade in the virtual world and fade out the real world may last from one or two seconds to 15 or more seconds, depending on the response of the user to the changes. The response of the user may be determined by tracking the gaze of the user.

The view of the real world is also referred to as the see-through view. Various methods exist for see-through HMD's, which can be grouped into techniques that are optically driven or camera driven. For example, a camera mounted on the head mounted display, and aimed towards the front of the HMD, can display the images of the scene in which the user is actually in, such as the user's living room. The images taken by this frontal camera are then shown on the display to give the user the impression of looking through the HMD, as if the HMD where transparent.

Optically driven techniques take advantage of mirrors and see-through glasses to guide the view of the user through the display or around the display into the real world. For example, these optically driven methods may include diffraction optics, holographic optics, polarized optics, and reflective optics.

To acclimate out the user, the process is reversed. Initially, the user is immersed in a virtual world display. When the system detects that the user wants to get out or needs to get out, the process to acclimate out the user is started. In one embodiment, the view of the real world starts fading in and being overimposed over the virtual world view. Then, the virtual view is gradually faded out while keeping the see-through view of the player's environment. At that point, the player is able to take off the HMD without physical consequences.

In some embodiments, the view of the virtual world may not be completely accurate as if the player where looking through the HMD. Instead of the real-world view, some other image may be presented to the user, as long at the image presented is done in a way that adjusts the eyes of the user to the user's environment. For example, the image presented may include an image of a room such that the eyes of the user have to focus on distances between a few feet and a few yards. Once the user's eyesight is adjusted, the user can take off the HMD without physical consequences because the user eyesight is already acclimated to a similar environment.

Further, in one embodiment, when transitioning out of the virtual world, the game objects stop moving, and the virtual world display freezes. Then, the display starts transitioning to show the real world as seen by the camera looking outwards from the HMD.

Figure 7B:
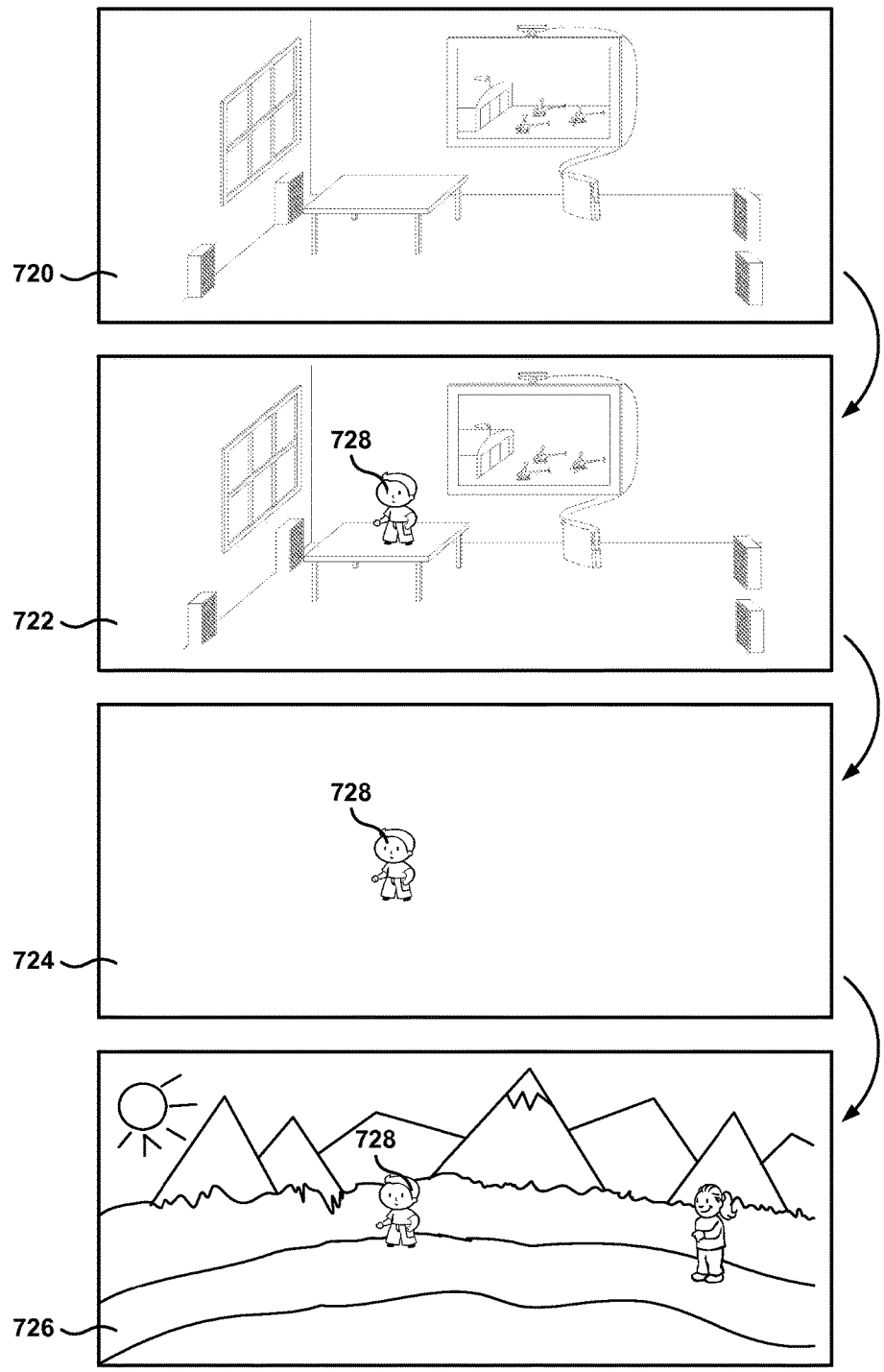
FIG. 7B illustrates a transition from real-life to augmented reality to virtual world views, according to one embodiment.

FIG. 7B illustrates a transition from real-life to augmented reality to virtual world, according to one embodiment. Augmented reality (AR) is a live, direct or indirect, view of a physical, real-world environment whose elements are augmented by computer-generated sensory input such as sound, video, or graphics. Augmented reality is related to a general concept called mediated reality, in which a view of reality is modified (possibly even diminished rather than augmented) by a computer. By contrast, virtual reality replaces the real world with a simulated one. Artificial information about the environment and its objects can be overlaid on the real world.

Some HMDs allow a Computer-Generated Image (CGI) to be superimposed on a real-world view to create an augmented reality or mixed reality. Combining real-world view with CGI can be done by projecting the CGI through a partially reflective mirror and viewing the real world directly. This method is often called Optical See-Through. Combining real-world view with CGI can also be done electronically by accepting video from a camera and mixing the video electronically with CGI. This method is often called Video See-Through.

In one embodiment, the HMD includes a front facing camera (facing out from the face of the user) that captures the world in front of the user. The video or images captured by the camera can then be reproduced on the display to create the see-through view. In order to place virtual objects on a real scene, the HMD needs to know how to identify a place in the real world where the virtual object can be placed. For example, a virtual character may be placed on a table or some other flat surface. Of course, in other embodiments the virtual object may be placed floating on the room, and all the HMD needs to do is present the virtual object at a distance from the HMD where no real world object is situated.

In one embodiment, the HMD uses the video images to determine the location of objects in the room. The camera may be a stereo camera or a depth camera used to determine the distances with reference to game objects. Once the HMD determines a flat surface, the virtual object may be placed on that surface.

In another embodiment, the positions of the real-world objects are calculated by a camera coupled to a computing device, such as a game console in communication with the HMD. The computing device is also tracking the location of the HMD, so the computing device may calculate the relative positions of objects in the room with reference to the HMD. The computer device transmits this information to the HMD in order to provide information about the real-world environment and the location of objects.

In one embodiment, to acclimate in the user to enter into a virtual world, an intermediate augmented reality view is provided. Initially, a see-through view 720 is presented to the user. Afterwards, a game object 728 (e.g., a character, but any other virtual object may be used) is placed in the augmented reality view. For example, the game object 728 may be placed on top of a table, or hanging on a wall, or in a TV screen, or on top of the game console, etc.

Then, the real world view is gradually faded out resulting in a virtual view 724 with only the game object 728. Afterwards, other game objects are gradually faded into view until the complete virtual world is rendered.

In one embodiment, the virtual world expands in circular fashion from the game object 728 until the complete display is filled up with the virtual scene. In another embodiment, virtual objects are added to the virtual scene one of the time, until all the virtual objects have been added.

In some embodiments, the virtual scene is frozen (i.e., no virtual object is in motion) until the entire virtual scene is filled up and the player is completely acclimated in.

It is noted that the embodiments illustrated in FIGS. 7A-7B are exemplary. Other embodiments may utilize different transitions, different virtual objects, different order of operations, etc. The embodiments illustrated in FIGS. 7A-7B should therefore not be interpreted to be exclusive or limiting, but rather exemplary or illustrative.

Figure 8:
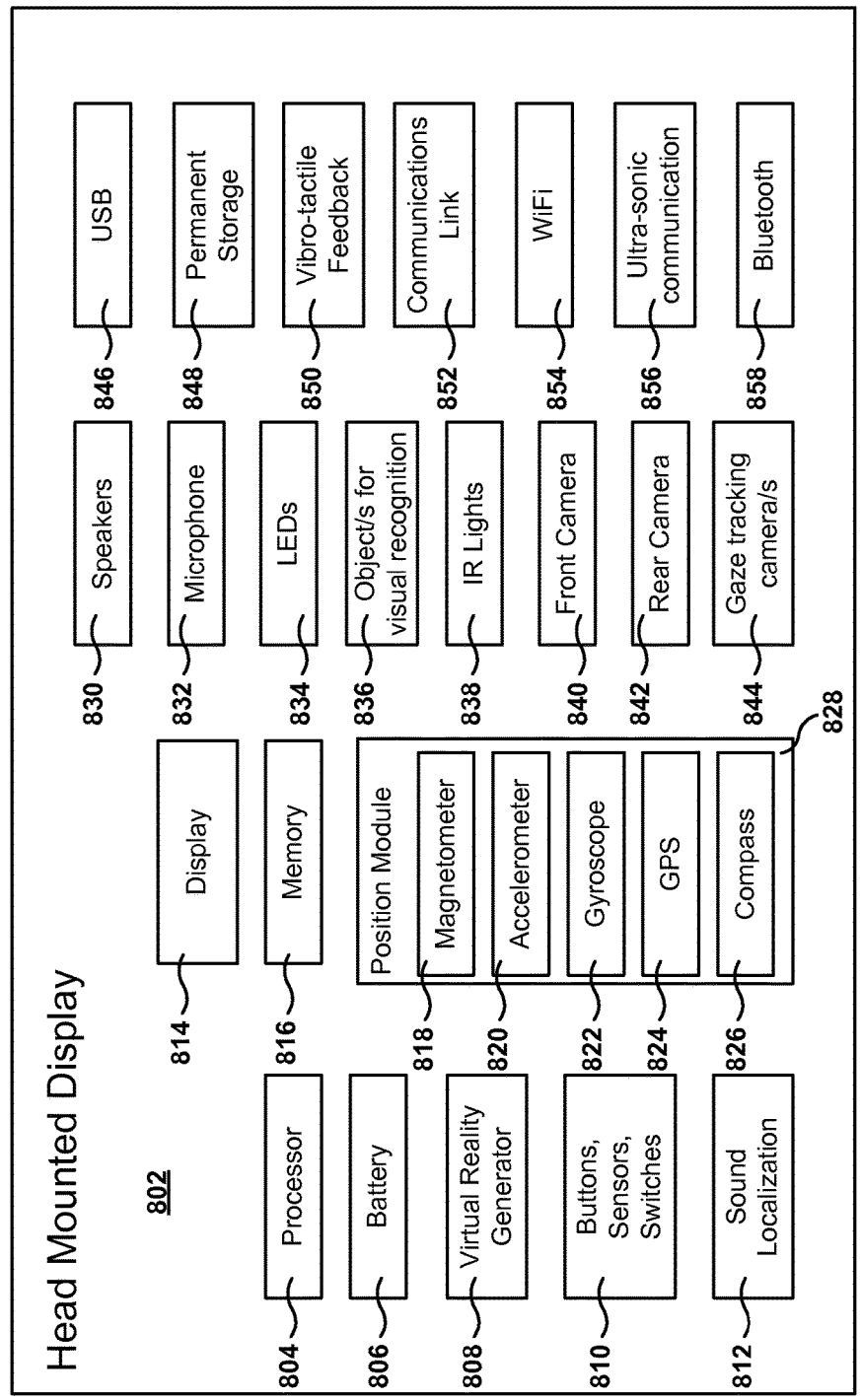
FIG. 8 illustrates the architecture of a device that may be used to implement embodiments of the invention.

FIG. 8 illustrates the architecture of a device that may be used to implement embodiments of the invention. The head mounted display is a computing device and includes modules usually found on a computing device, such as a processor 804, memory 816 (RAM, ROM, etc.), one or more batteries 806 or other power sources, and permanent storage 848 (such as a hard disk).

The communication modules allow the HMD to exchange information with other portable devices, other computers, other HMD's, servers, etc. The communication modules include a Universal Serial Bus (USB) connector 846, a communications link 852 (such as Ethernet), ultrasonic communication 856, Bluetooth 858, and WiFi 854.

The user interface includes modules for input and output. The input modules include input buttons and sensors 810, microphone 832, touch sensitive screen (not shown, that may be used to configure or initialize the HMD), front camera 840, rear camera 842, gaze tracking cameras 844. Other input/output devices, such as a keyboard or a mouse, can also be connected to the portable device via communications link, such as USB or Bluetooth.

The output modules include the display 814 for rendering images in front of the user's eyes. Some embodiments may include one display and other embodiments may include two displays, one for each eye. Other output modules include Light-Emitting Diodes (LED) 834 (which may also be used for visual tracking of the HMD), vibro-tactile feedback 850, speakers 830, and sound localization module 812, which performs sound localization for sounds to be delivered to speakers or headphones. Other output devices, such as headphones, can also connect to the HMD via the communication modules.

The elements that may be included to facilitate motion tracking include LEDs 834, one or more objects for visual recognition 836, and infrared lights 838.

Information from different devices can be used by the Position Module 828 to calculate the position of the HMD. These modules include a magnetometer 818, an accelerometer 820, a gyroscope 822, a Global Positioning System (GPS) module 824, and a compass 826. Additionally, the Position Module can analyze sound or image data captured with the cameras and the microphone to calculate the position. Further yet, the Position Module can perform tests to determine the position of the portable device or the position of other devices in the vicinity, such as WiFi ping test or ultrasound tests.

A Virtual Reality Generator 808 creates the virtual or augmented reality, as previously described, using the position calculated by the Position Module. The virtual reality generator 808 may cooperate with other computing devices (e.g., game console, Internet server, etc.) to generate images for the screen. The remote devices may send screen updates or instructions for creating game objects on the screen.

It should be appreciated that the embodiment illustrated in FIG. 8 is an exemplary implementation of a portable device. Other embodiments may utilize different modules, a subset of the modules, or assign related tasks to different modules. The embodiment illustrated in FIG. 8 should therefore not be interpreted to be exclusive or limiting, but rather exemplary or illustrative.

FIGS. 9A-9B illustrate different types of inputs for transitioning out of the HMD environment, according to several embodiments. The process to acclimate out the user may be initiated by an action of the user, or triggered by some other environmental event. For example, if the system detects that the user may be experiencing difficulties, the acclimatization out will be started.

In one embodiment, the exit process is started by a gesture from the user which is captured by a computing device coupled to a camera taken images of the user (e.g., the environment of FIG. 1). In the exemplary embodiment of FIG. 9A, the user makes a circular motion with the hand closed and the thumb extended to indicate that the user wishes to exit, but any other predefined gesture may be utilized.

In another embodiment, the user closes her eyes for a predetermined amount of time to signal the exit command. For example, if the user closes her eyes for more than three seconds, the exit process may be started, but other periods in the range of 1 to 10 seconds may be utilized. The detection of the user closing her eyes is done by analyzing the images taken with the cameras tracking the gaze of the user inside the HMD (see for example the embodiments of FIG. 3).

In other embodiments, the user says a predetermined command to initiate the exit process. For example, in the exemplary embodiment of FIG. 9B the user says the sentence "pause game" to exit. In one embodiment, the speech is detected by a computing device in communication with the HMD, and in another embodiment the speech is detected by the HMD itself, which captures speech via a microphone in the HMD.

In some embodiments, the exit process may be initiated when the system detects that the user is having difficulties. Biometric sensors may be used to determine discomfort on the user. In one embodiment, an exit sequence will be started when the system determines that the gaze of the user has been erratic for a period of time, and the gaze of the user is not consistent with activities related to game play.

In another embodiment, the movements of the user, and more particularly the movements of the head of the user (which are being tracked by the computing device tracking the motion of the HMD) are tracked. If the motion of the head of the user becomes erratic and inconsistent with the motions related to the gaze of the user or related to game activities, the system will determine that the user is having physical difficulties and initiate the exit process.

In one embodiment, the analysis of the gaze of the user is combined with the analysis of the motion of the head of the user to determine a behavior that may indicate a problem. If a problem behavior is determined, the exit process will be initiated for a safe acclimatization out.

FIG. 10 illustrates a mixed display with virtual world and real-life view, according to one embodiment. Sometimes, the HMD user is interrupted by an event in real life. For example, the user may receive a phone call, another person may talk to the user, etc. In these cases, the user needs to interact with the real world fast and it may be inconvenient to perform the process to acclimate the user out. In fact, if there is enough urgency the user will have the tendency to tear off the HMD, thereby avoiding the process to acclimate the user out. This can result in physical discomfort for the user.

In one embodiment, in order to provide quick access to the real world, the user is provided with a window into the real world to enable the user to interact in the real world without having to take off the HMD. For example, if the user looks down for two seconds or more, the HMD will open a window into the real world.

In the exemplary embodiment of FIG. 10, the bottom half of the screen (or some other fraction) shows a see-through view 154, while the top half of the display 152 remains with the virtual scene. This way, the user is able to answer a phone call, or check the caller ID in the phone.

In other embodiments, the "window" into the real world may be situated in a center of the display (e.g., a rectangle), on one side of the display, on a corner of the display, etc.

In one embodiment, after a predetermined amount of time in mixed view mode, the HMD will start the process to acclimate out. For example, the user may be talking on the phone and it is likely that after one minute on the phone the user wishes to get out of the HMD. However, since the user is busy on her phone call she may not spend the time to enter a command to initiate the acclimatization out.

In other embodiments, the HMD is in communication with other computing device, and the mixed view may be initiated by message from the remote computing device. For example, the HMD may communicate via Bluetooth with a phone, and when the user receives a phone call, the HMD shows the caller ID on the display and starts the mixed view mode. This allows the user to decide quickly if the user wants to answer the phone call.

Figure 11:
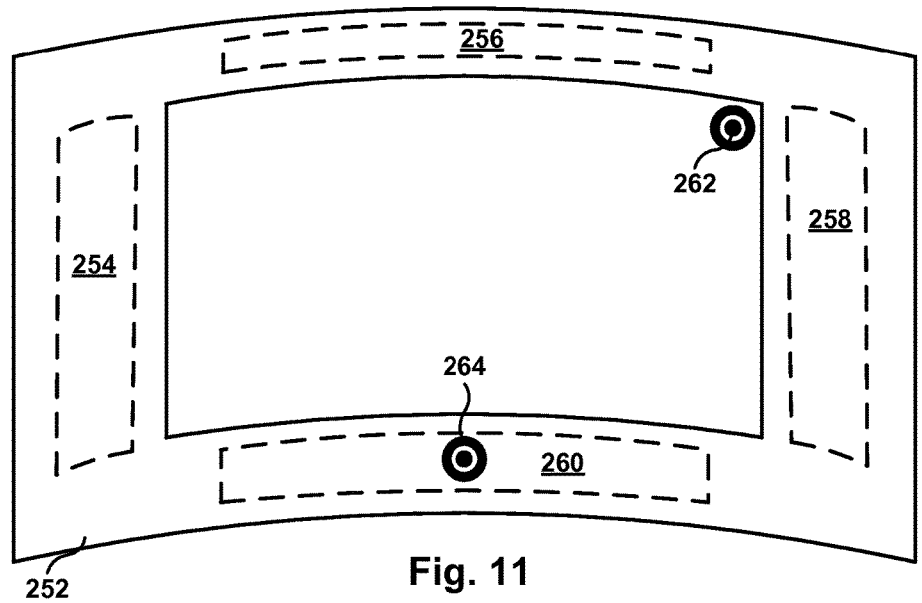
FIG. 11 illustrates the detection of an exit command entered via gaze, according to one embodiment.

FIG. 11 illustrates the detection of an exit command entered via gaze, according to one embodiment. In some embodiments, gaze gestures can be detected to start the exit process. For example, the user may look down for a period of time (as described above with reference to FIG. 10) or the user may look to a specific target on the display, or around the display, to indicate the intention to exit.

For example, the gaze areas that can be targets to detect an exit command may include circular targets 262 and 264, or larger areas, such as an area on top or above the display 256, an area to the left of the display 254, an area to the right of the display to fight eight, an area below the display 260, etc. In some embodiments, two or more of these areas may be used as gaze targets.

In other embodiments, the user may indicate the exit command by performing a specific trajectory with the gaze on the display. For example, the user may trace with her gaze the same trajectory described previously with reference to FIG. 6B.

Figure 12:
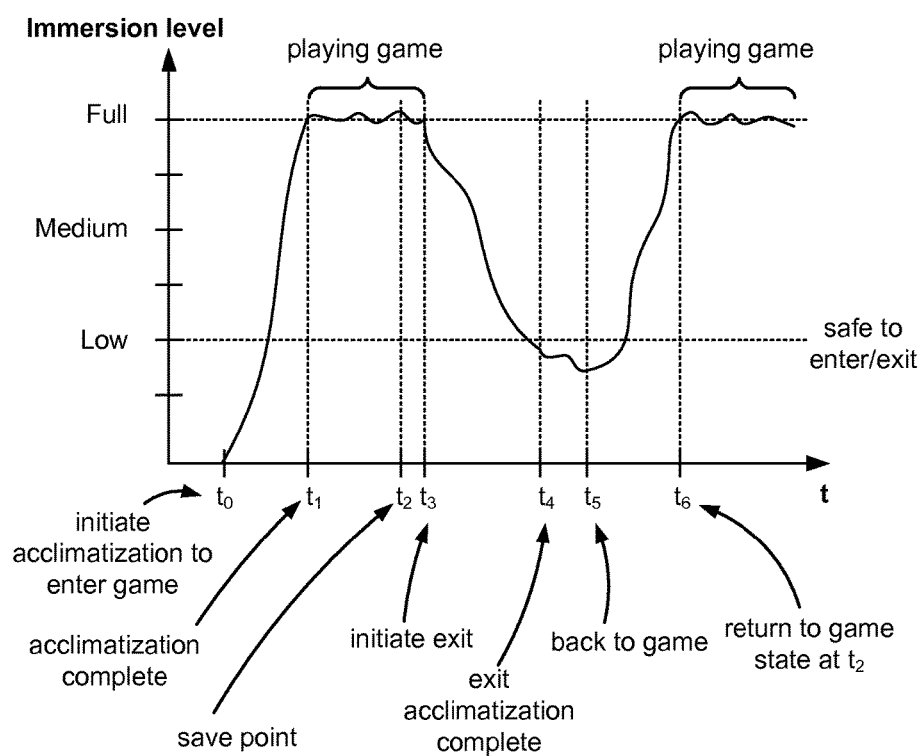
FIG. 12 illustrates different phases of immersion for the HMD view, according to one embodiment.

FIG. 12 illustrates different phases of immersion for the HMD view, according to one embodiment. When the user gets interrupted while playing a game, it's important that when the user resumes the gaming activity, the game returns to the same place where the user was, without hurting progress in the game for the user. For example, a user would hate to lose a life in the game just because somebody call her on the phone.

In one embodiment, the system detects the exit command and starts the acclimatization out, as previously discussed. The system (e.g., the HMD, the game console, or both) saves the game status to enable the user to return to the game. In one embodiment, the game keeps a history of game activity and when the player returns, game play is resumed at a point corresponding to a short time before the user started the exit process. For example, the user may have been interrupted by a real-life event, and it may have taken the user a few seconds to enter the exit command. This delay may cost the user some loss of game progress. In order to avoid dissatisfaction with the game, the game returns to a point where it is safe to assume that the user was still fully engaged in playing the game. In some embodiments, a margin interval, which is defined as the difference between the restore time and the time when the exit command was entered, is used. The restore time is the time where the game is resumed when the player returns to the game.

FIG. 12 illustrates an example of how a player enters and exits the game. For description purposes, the immersion level is defined as the degree of acclimatization of the user to the HMD. A full immersion level means that the user has been acclimatized to the HMD, and a low immersion level means that the user has not gone through acclimatization process to start using the HMD.

Initially, at $t_0$, the user puts on the HMD and starts to acclimate in. After a while, at $t_1$, the user has been acclimatized and starts playing the game. A while later, at $t_3$, the game detects that the user needs to be acclimated out, either because the user has entered a command, or because the system has detected a potential problem.

After the process to acclimate out ends, at $t_4$, the user is able to take off the HMD. Later, at $t_5$, the user puts on the HMD again and requests to be acclimated in again. At $t_6$, the user has been acclimated in and game resumes.

In one embodiment, the game resumes at exactly the same status as the game was at the time $t_3$ that the user started to acclimate out. In other embodiments, the game will resume a game state corresponding to a time previous to the time when the exit process started, such as at $t_2$.

Figure 13C:
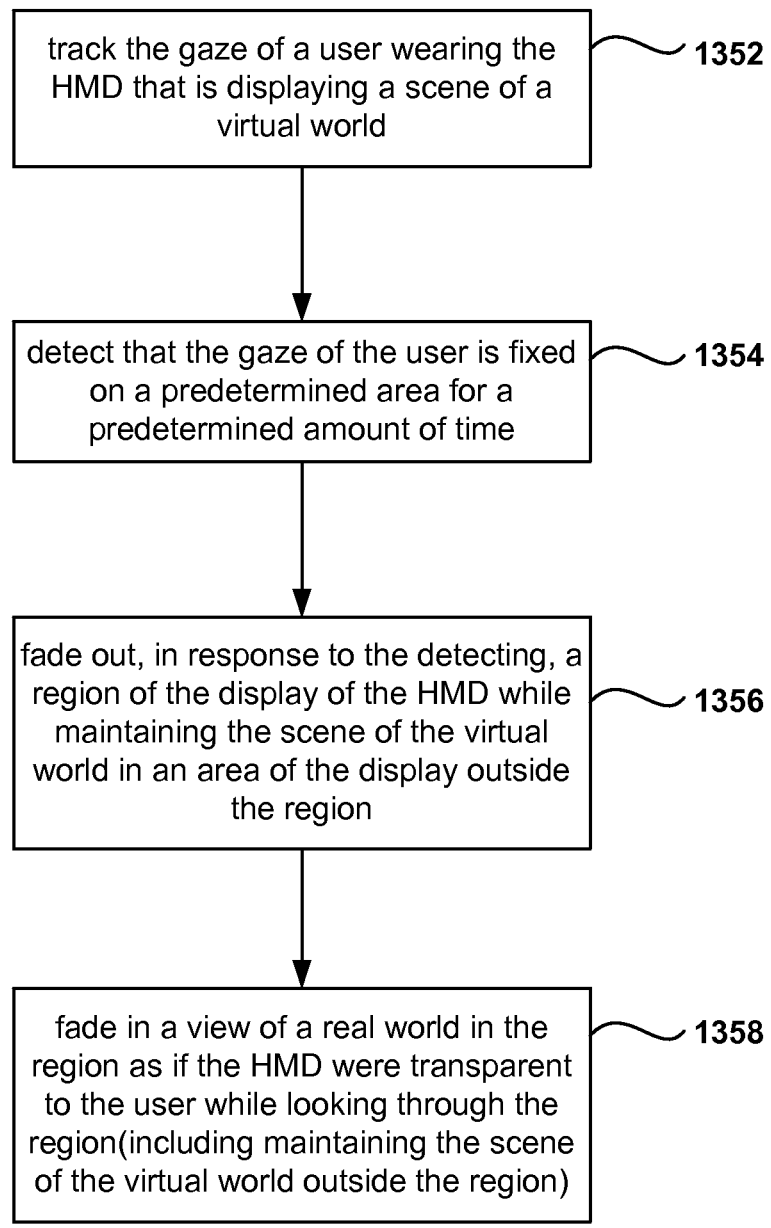
FIG. 13C is a flowchart for managing the display of images on the HMD, according to one embodiment.

FIG. 13A is a flowchart for acclimating in a user to the HMD, according to one embodiment. While the various operations in the flowcharts of FIGS. 13A-13C are presented and described sequentially, one of ordinary skill will appreciate that some or all of the operations may be executed in a different order, be combined or omitted, or be executed in parallel.

In operation 1302, the system validates that the user is wearing the HMD and looking at the display. For example, the embodiments described hereinabove with reference to FIG. 6A may be used to validate the user.

From operation 1302 the method flows to operation 1304, where an image of the real world is shown on the display of the HMD. The image of the real world is a see-through image presented on the HMD, as if the HMD were transparent while the user is looking towards the real world.

In operation 1306, a virtual object is faded in and superimposed on the image of the real world. The virtual object, in one embodiment, is presented in augmented reality mode. In another embodiment, the virtual object is merely overimposed on the existing image of the real world without requiring augmented reality.

From operation 1306, the method flows to operation 1308 where the real world view is gradually faded out while the virtual object added in operation 1306 is kept on the display. Therefore, at the end of operation 1308 the display will show only the virtual object.

From operation 1308, the method flows to operation 1310 where the virtual world is gradually faded in around the virtual object already present on the display. At the end of operation 1310, the user is considered to be acclimated in and HMD operations may begin.

FIG. 13B is a flowchart for acclimating out the user of the HMD, according to one embodiment. In operation 1320, the system detects a request to exit the virtual world displayed on the HMD. As discussed above, the exit may be caused by an action of the user or may be the result of a condition detected by the system.

From operation 1320, the method flows to operation 1322 where the virtual world is gradually faded out except for one or more virtual objects that remain on the display. From operation 1322, the method flows to operation 1324 where the real world image (e.g., see-through view) is gradually faded in while maintaining the one or more virtual objects preserved in operation 1322. The one or more virtual objects are displayed in augmented reality mode and overimposed on the real world view.

From operation 1324, the method flows to operation 1326 where the one or more virtual objects are faded out. As a result, at the end of operation 1326 only a see-through view is presented on the display. At this point, the user is acclimated out and may take off the HMD.

FIG. 13C is a flowchart for managing the display of images on the HMD, according to one embodiment. In operation 1352, the gaze of the user wearing the HMD is tracked. The HMD is displaying a scene of a virtual world.

From operation 1352, the method flows to operation 1354 where the system performs an operation to detect that the gaze of the user is fixed on a predetermined area for a predetermined amount of time (see for example the embodiments described hereinabove with reference to FIG. 11).

From operation 1354, the method flows to operation 1356 to fade out, in response to the detecting in operation 1354, a region of a display of the HMD, while maintaining the scene of the virtual world in an area of the display outside the region. In some embodiments, the region of the display covers only a part of the display and does not include the whole display.

From operation 1356, the method flows to operation 1358 to fade in a view of the real world in the region, as if the HMD were transparent to the user while looking through the region (i.e., in see-through view mode). While fading in the real world, the scene of the virtual world is maintained outside the region. This way, the user is offered a window into the real world to be able to interact with the real world quickly.

Figure 14:
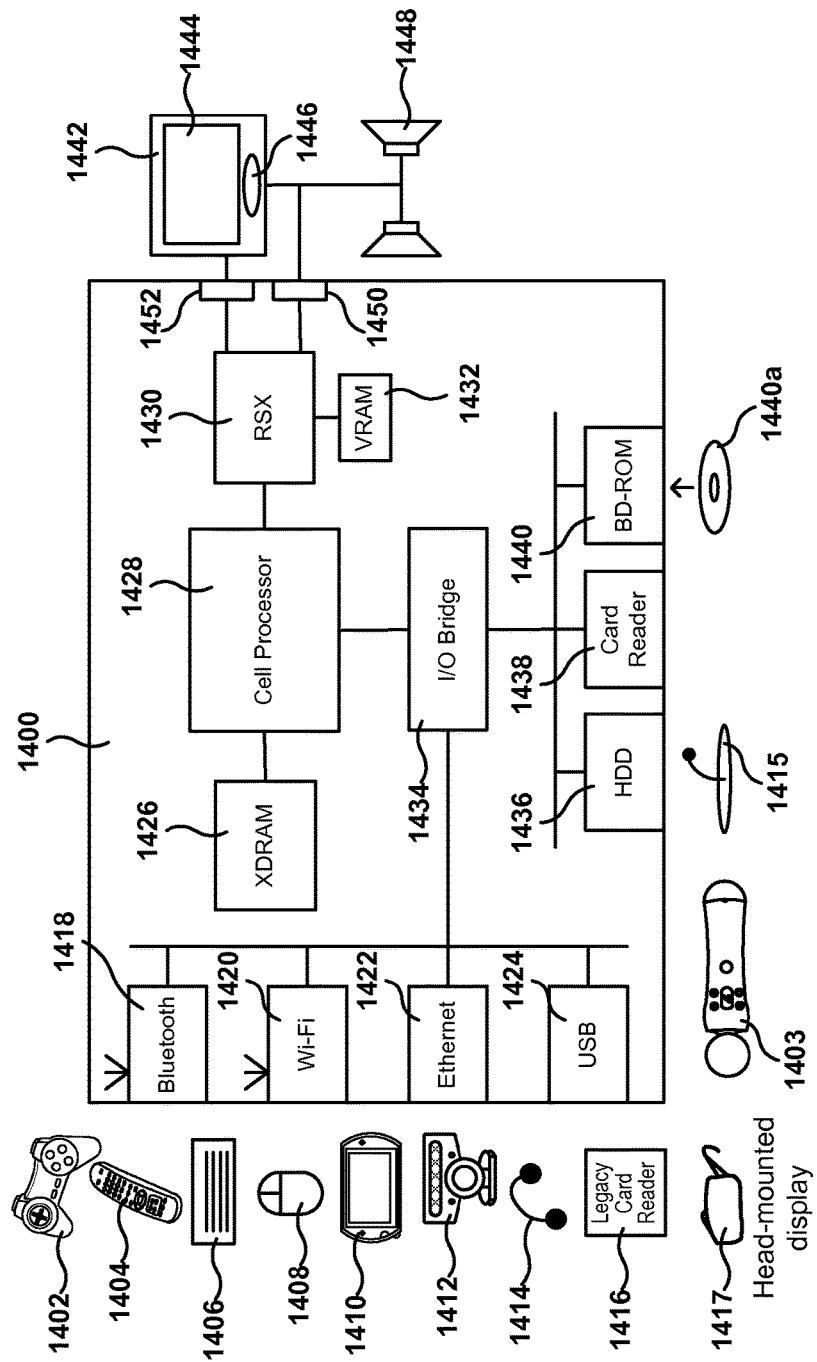
FIG. 14 illustrates hardware and user interfaces that may be used to implement embodiments of the invention.

FIG. 14 illustrates hardware and user interfaces that may be used to implement embodiments of the invention. FIG. 14 schematically illustrates the overall system architecture of the Sony® PlayStation® 3 entertainment device. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu-ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403 and HMD 1417. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403 and HMD 1417, such as: a remote control 1404; a keyboard 1406; a mouse 1408; a portable entertainment device 1410 such as a Sony PSP® entertainment device; a video camera such as a PlayStation® Eye Camera 1412; headphones 1414; and a microphone 1415. Such peripheral devices may therefore in principle be connected to the system unit 1400 wirelessly; for example the portable entertainment device 1410 may communicate via a Wi-Fi ad-hoc connection, while the headphones 1414 may communicate via a Bluetooth link.

The provision of these interfaces means that the PlayStation 3 device is also potentially compatible with other peripheral devices such as digital video recorders (DVRs), set-top boxes, digital cameras, portable media players, Voice over Internet Protocol (IP) telephones, mobile telephones, printers and scanners. In addition, a legacy memory card reader 1416 may be connected to the system unit via a USB port 1424, enabling the reading of memory cards of the kind used by the PlayStation or PlayStation 2 devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape facing the game console, and wireless communications using protocols such as Bluetooth®, WiFi™, etc. The recognizable shape can be in a shape substantially of a sphere, a cube, parallelogram, a rectangular parallelepiped, a cone, a pyramid, an imperfect sphere, a soccer ball, a football or rugby ball, a section of a sphere, a truncated pyramid, a truncated cone, a baseball bat, a truncated cube, a polyhedron, a star, etc., or a combination of two of more of these shapes.

Game controller 1402 is a controller designed to be used with two hands, and game controller 1403 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Sony PSP® portable device may be used as a controller. In the case of the Sony PSP® portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu-ray Disk BD-ROM reader 1440 and for the navigation of disk content.

The Blu-ray Disk BD-ROM reader 1440 is operable to read CD-ROMs compatible with the PlayStation and PlayStation 2 devices, in addition to conventional pre-recorded and recordable CDs, and so-called Super Audio CDs. The reader 1440 is also operable to read DVD-ROMs compatible with the PlayStation 2 and PlayStation 3 devices, in addition to conventional pre-recorded and recordable DVDs. The reader 1440 is further operable to read BD-ROMs compatible with the PlayStation 3 device, as well as conventional pre-recorded and recordable Blu-ray Disks.

The system unit 1400 is operable to supply audio and video, either generated or decoded by the PlayStation 3 device via the Reality Synthesizer graphics unit (RSX) 1430, through audio 1450 and video 1452 connectors to a display and sound output device 1442 such as a monitor or television set having a display 1444 and one or more loudspeakers 1446, or stand-alone speakers 1448. In one embodiment, voice and gaze inputs are utilized to play sound toward specific audio speakers according to the Point of Gaze (POG) of the user. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The PlayStation 3 device's operating system supports Dolby® 5.1 surround sound, Dolby® Theatre Surround (DTS), and the decoding of 7.1 surround sound from Blu-ray disks.

In the present embodiment, the video camera 1412 comprises a single Charge Coupled Device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Figure 15:
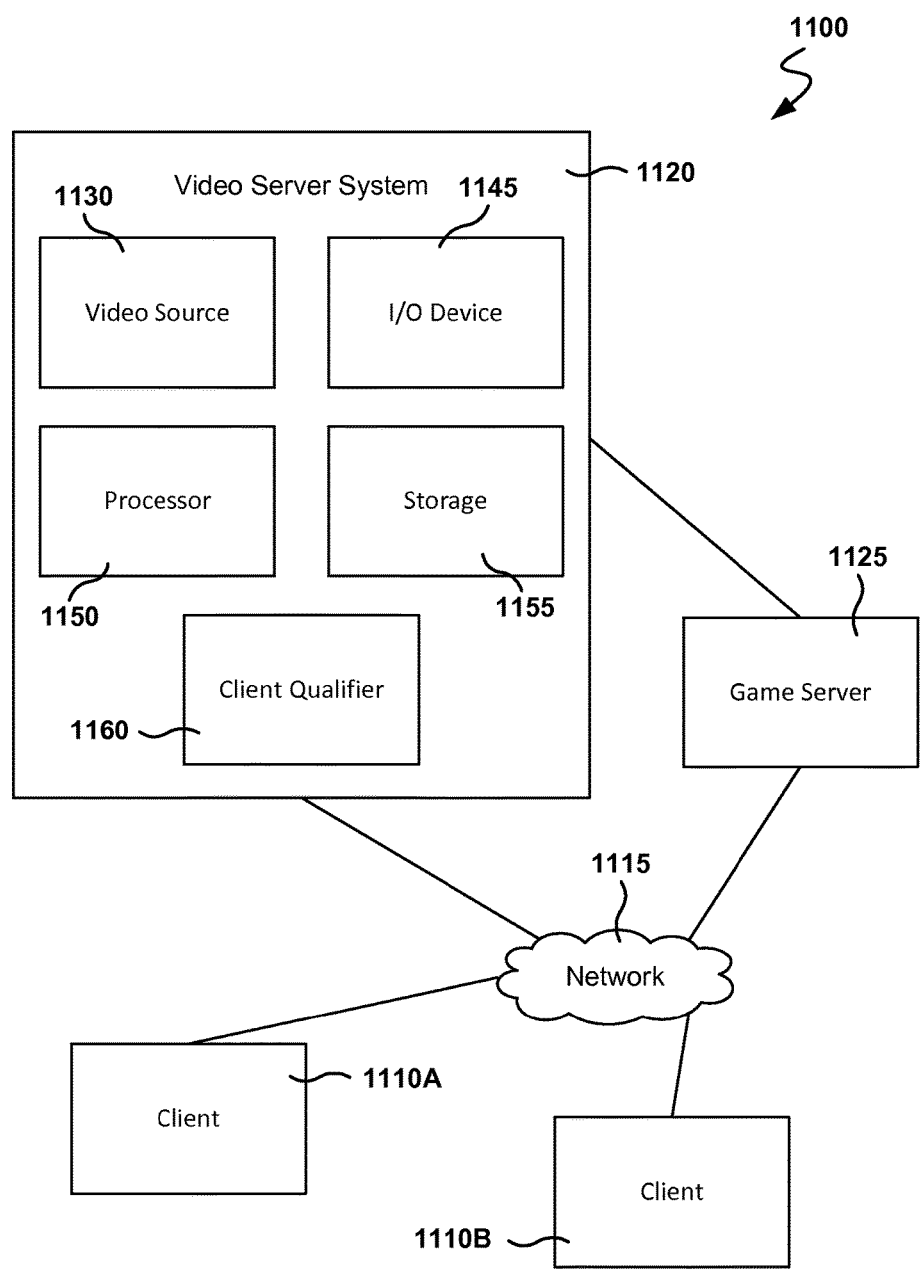
FIG. 15 is a block diagram of a game system, according to various embodiments of the invention.

FIG. 15 is a block diagram of a Game System 1100, according to various embodiments of the invention. Game System 1100 is configured to provide a video stream to one or more Clients 1110 via a Network 1115. Game System 1100 typically includes a Video Server System 1120 and an optional game server 1125. Video Server System 1120 is configured to provide the video stream to the one or more Clients 1110 with a minimal quality of service. For example, Video Server System 1120 may receive a game command that changes the state of or a point of view within a video game, and provide Clients 1110 with an updated video stream reflecting this change in state with minimal lag time. The Video Server System 1120 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1120 frames per second. Although higher or lower frame rates are included in alternative embodiments of the invention.

Clients 1110, referred to herein individually as 1110A, 1110B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1110 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1110 or on a separate device such as a monitor or television. Clients 1110 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1110 are optionally geographically dispersed. The number of clients included in Game System 1100 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1120 to deliver a game viewed through the HMD. In one embodiment, the game console receives the video stream from the video server system 1120, and the game console forwards the video stream, or updates to the video stream, to the HMD for rendering.

Clients 1110 are configured to receive video streams via Network 1115. Network 1115 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1110 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1110 may, but are not required to, further include systems configured for modifying received video. For example, a client may be configured to perform further rendering, to overlay one video image on another video image, to crop a video image, and/or the like. For example, Clients 1110 may be configured to receive various types of video frames, such as I-frames, P-frames and B-frames, and to process these frames into images for display to a user. In some embodiments, a member of Clients 1110 is configured to perform further rendering, shading, conversion to 3-D, or like operations on the video stream. A member of Clients 1110 is optionally configured to receive more than one audio or video stream. Input devices of Clients 1110 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1110 is generated and provided by Video Server System 1120. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1110 are typically configured to receive inputs from a user. These inputs may include game commands configured to change the state of the video game or otherwise affect game play. The game commands can be received using input devices and/or may be automatically generated by computing instructions executing on Clients 1110. The received game commands are communicated from Clients 1110 via Network 1115 to Video Server System 1120 and/or Game Server 1125. For example, in some embodiments, the game commands are communicated to Game Server 1125 via Video Server System 1120. In some embodiments, separate copies of the game commands are communicated from Clients 1110 to Game Server 1125 and Video Server System 1120. The communication of game commands is optionally dependent on the identity of the command. Game commands are optionally communicated from Client 1110A through a different route or communication channel that that used to provide audio or video streams to Client 1110A.

Game Server 1125 is optionally operated by a different entity than Video Server System 1120. For example, Game Server 1125 may be operated by the publisher of a multiplayer game. In this example, Video Server System 1120 is optionally viewed as a client by Game Server 1125 and optionally configured to appear from the point of view of Game Server 1125 to be a prior art client executing a prior art game engine. Communication between Video Server System 1120 and Game Server 1125 optionally occurs via Network 1115. As such, Game Server 1125 can be a prior art multiplayer game server that sends game state information to multiple clients, one of which is game server system 1120. Video Server System 1120 may be configured to communicate with multiple instances of Game Server 1125 at the same time. For example, Video Server System 1120 can be configured to provide a plurality of different video games to different users. Each of these different video games may be supported by a different Game Server 1125 and/or published by different entities. In some embodiments, several geographically distributed instances of Video Server System 1120 are configured to provide game video to a plurality of different users. Each of these instances of Video Server System 1120 may be in communication with the same instance of Game Server 1125. Communication between Video Server System 1120 and one or more Game Server 1125 optionally occurs via a dedicated communication channel. For example, Video Server System 1120 may be connected to Game Server 1125 via a high bandwidth channel that is dedicated to communication between these two systems.

Video Server System 1120 comprises at least a Video Source 1130, an I/O Device 1145, a Processor 1150, and non-transitory Storage 1155. Video Server System 1120 may include one computing device or be distributed among a plurality of computing devices. These computing devices are optionally connected via a communications system such as a local area network.

Video Source 1130 is configured to provide a video stream, e.g., streaming video or a series of video frames that form a moving picture. In some embodiments, Video Source 1130 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1125. Game Server 1125 may maintain a copy of the state of the game based on game commands received from multiple players using geographically disperse clients. In these cases, the game state is provided by Game Server 1125 to Video Source 1130, wherein a copy of the game state is stored and rendering is performed. Game Server 1125 may receive game commands directly from Clients 1110 via Network 1115, and/or may receive game commands via Video Server System 1120.

Video Source 1130 typically includes rendering logic, e.g., hardware, firmware, and/or software stored on a computer readable medium such as Storage 1155. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1110. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof.

P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1130 includes a video recording device such as a camera. This camera may be used to generate delayed or live video that can be included in the video stream of a computer game. The resulting video stream, optionally includes both rendered images and images recorded using a still or video camera. Video Source 1130 may also include storage devices configured to store previously recorded video to be included in a video stream. Video Source 1130 may also include motion or positioning sensing devices configured to detect motion or position of an object, e.g., person, and logic configured to determine a game state or produce video-based on the detected motion and/or position.

Video Source 1130 is optionally configured to provide overlays configured to be placed on other video. For example, these overlays may include a command interface, log in instructions, messages to a game player, images of other game players, video feeds of other game players (e.g., webcam video). In embodiments of Client 1110A including a touch screen interface or a gaze detection interface, the overlay may include a virtual keyboard, joystick, touch pad, and/or the like. In one example of an overlay a player's voice is overlaid on an audio stream. Video Source 1130 optionally further includes one or more audio sources.

In embodiments wherein Video Server System 1120 is configured to maintain the game state based on input from more than one player, each player may have a different point of view comprising a position and direction of view. Video Source 1130 is optionally configured to provide a separate video stream for each player based on their point of view. Further, Video Source 1130 may be configured to provide a different frame size, frame data size, and/or encoding to each of Client 1110. Video Source 1130 is optionally configured to provide 3-D video.

I/O Device 1145 is configured for Video Server System 1120 to send and/or receive information such as video, commands, requests for information, a game state, gaze information, device motion, device location, user motion, client identities, player identities, game commands, security information, audio, and/or the like. I/O Device 1145 typically includes communication hardware such as a network card or modem. I/O Device 1145 is configured to communicate with Game Server 1125, Network 1115, and/or Clients 1110.

Processor 1150 is configured to execute logic, e.g. software, included within the various components of Video Server System 1120 discussed herein. For example, Processor 1150 may be programmed with software instructions in order to perform the functions of Video Source 1130, Game Server 1125, and/or a Client Qualifier 1160. Video Server System 1120 optionally includes more than one instance of Processor 1150. Processor 1150 may also be programmed with software instructions in order to execute commands received by Video Server System 1120, or to coordinate the operation of the various elements of Game System 1100 discussed herein. Processor 1150 may include one or more hardware device. Processor 1150 is an electronic processor.

Storage 1155 includes non-transitory analog and/or digital storage devices. For example, Storage 1155 may include an analog storage device configured to store video frames. Storage 1155 may include a computer readable digital storage, e.g. a hard drive, an optical drive, or solid state storage. Storage 1115 is configured (e.g. by way of an appropriate data structure or file system) to store video frames, artificial frames, a video stream including both video frames and artificial frames, audio frame, an audio stream, and/or the like. Storage 1155 is optionally distributed among a plurality of devices. In some embodiments, Storage 1155 is configured to store the software components of Video Source 1130 discussed elsewhere herein. These components may be stored in a format ready to be provisioned when needed.

Video Server System 1120 optionally further comprises Client Qualifier 1160. Client Qualifier 1160 is configured for remotely determining the capabilities of a client, such as Clients 1110A or 1110B. These capabilities can include both the capabilities of Client 1110A itself as well as the capabilities of one or more communication channels between Client 1110A and Video Server System 1120. For example, Client Qualifier 1160 may be configured to test a communication channel through Network 1115.

Client Qualifier 1160 can determine (e.g., discover) the capabilities of Client 1110A manually or automatically. Manual determination includes communicating with a user of Client 1110A and asking the user to provide capabilities. For example, in some embodiments, Client Qualifier 1160 is configured to display images, text, and/or the like within a browser of Client 1110A. In one embodiment, Client 1110A is an HMD that includes a browser. In another embodiment, client 1110A is a game console having a browser, which may be displayed on the HMD. The displayed objects request that the user enter information such as operating system, processor, video decoder type, type of network connection, display resolution, etc. of Client 1110A. The information entered by the user is communicated back to Client Qualifier 1160.

Automatic determination may occur, for example, by execution of an agent on Client 1110A and/or by sending test video to Client 1110A. The agent may comprise computing instructions, such as java script, embedded in a web page or installed as an add-on. The agent is optionally provided by Client Qualifier 1160. In various embodiments, the agent can find out processing power of Client 1110A, decoding and display capabilities of Client 1110A, lag time reliability and bandwidth of communication channels between Client 1110A and Video Server System 1120, a display type of Client 1110A, firewalls present on Client 1110A, hardware of Client 1110A, software executing on Client 1110A, registry entries within Client 1110A, and/or the like.

Client Qualifier 1160 includes hardware, firmware, and/or software stored on a computer readable medium. Client Qualifier 1160 is optionally disposed on a computing device separate from one or more other elements of Video Server System 1120. For example, in some embodiments, Client Qualifier 1160 is configured to determine the characteristics of communication channels between Clients 1110 and more than one instance of Video Server System 1120. In these embodiments the information discovered by Client Qualifier can be used to determine which instance of Video Server System 1120 is best suited for delivery of streaming video to one of Clients 1110.

Embodiments of the present invention may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein that form part of the embodiments are useful machine operations. The embodiments also relate to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for managing display of images on a head mounted device (HMD), the method comprising:
    presenting video data on a display of the HMD, the video data providing a view of a virtual world;
    tracking a gaze of a user wearing the HMD that is displaying the video data;
    detecting that the gaze of the user is fixed on a predetermined area of the display for a predetermined amount of time, which triggers modification to the video data presented at the display, without requiring user action, wherein the modification of the video data includes,
        fading out a portion of the video data that is being rendered in the predetermined area of the display of the HMD while maintaining the view of the virtual world in an area of the display outside the predetermined area; and
        fading in a portion of an image of a real world in the predetermined area, wherein the image of the real world is captured by a forward facing camera of the HMD and the portion of the image of the real world corresponds to a direction of the gaze of the user, the fading in simulating a see-through mode of the display in the predetermined area by extending a view of the user through the HMD into the real world in the direction of the gaze, while the area outside of the predetermined area continues to present the view of the virtual world,
    wherein the fading out of the video data and the fading in of the image of the real world is performed for a period of time.

2. The method as recited in claim 1, wherein the predetermined area, where the gaze of the user has been detected for a predetermined amount of time, is one of an area defined below the display, an area defined to a side of the display, an area defined above the display, or an area defined on a corner of the display.

3. The method as recited in claim 1, wherein the predetermined area, where the gaze of the user has been detected for a predetermined amount of time, is defined below the display, and wherein the region is a bottom half of the display.

4. The method as recited in claim 1, wherein the predetermined area is a rectangle centered on the display.

5. The method as recited in claim 1, further including:
    providing an option for user confirmation before fading in the portion of the image of the real world in the predetermined area.

6. The method as recited in claim 1, further including:
    receiving a command from the user to terminate rendering of the image of the real world;
    in response to the command, fading out the portion of the image of the real world in the predetermined area of the display; and
    fading in the portion of the virtual world that corresponds with the predetermined area while keeping the view of the virtual world in the area outside the predetermined area.

7. The method as recited in claim 1, wherein tracking the gaze further includes:
    capturing images of eyes of the user with a camera inside the HMD; and
    analyzing the captured images to determine the gaze of the user.

8. The method as recited in claim 1, wherein the predetermined amount of time is two seconds.

9. The method of claim 1, further comprising,
    detecting a notification from a device of the user, wherein the view in the direction of the gaze is toward the device.

10. The method of claim 9, wherein the notification is a phone call or a message being received via the device.

11. A method for managing images rendered on a display of a head mounted device (HMD), the method comprising:
    detecting an operation to acclimate a user to the HMD;
    presenting a view of a real world on the display to simulate a see-through mode for the display of the HMD, the view of the real world captured by a camera disposed on a front side of the HMD;
    adding a virtual element from a virtual world to the view of the real world to simulate an augmented reality mode for the display, wherein the virtual element is added in an area on the display by fading out a portion of the view of the real world rendered in the area and fading in the virtual element, such that the view of the real world is not visible in the area occupied by the virtual element;

after adding the virtual element in the area, fading out a portion of the view of the real world that corresponds with a second area of the display that is outside the area occupied by the virtual element while maintaining the virtual element on the display in the area without fading the virtual element; and fading in a portion of a view of the virtual world that corresponds with the second area of the display while keeping the virtual element, wherein fading in the portion of the view of the virtual world includes adding additional virtual elements that form the virtual world, wherein the virtual element is present during the fading out the portion of the view of the real world and the fading in of the virtual world to assist the user to acclimate into the view of the virtual world.

12. The method as recited in claim 11, wherein the augmented reality mode includes presenting the virtual element as if the virtual element was located in the real world, wherein a motion of the HMD with respect to the real world causes a change in the view of the real world while maintaining the virtual element in a same location in the real world.

13. The method as recited in claim 11, wherein the real world and the virtual world are not blended on the display except for the virtual element.

14. The method as recited in claim 11, wherein the real world and the virtual world are blended during the fade out of the real world.

15. The method as recited in claim 11, wherein operations of the method are performed by a computer program when executed by one or more processors, the computer program being embedded in a non-transitory computer-readable storage medium.

16. A non-transitory computer-readable storage medium storing a computer program, the computer-readable storage medium comprising:
    program instructions for presenting video data on a display of the HMD, the video data providing a view of a virtual world;
    program instructions for tracking a gaze of a user wearing the HMD that is displaying the video data;
    program instructions for detecting that the gaze of the user is fixed on a predetermined area of the display for a predetermined amount of time, which triggers modification to the video data presented at the display without requiring user action, wherein the modification of the video data includes,
        program instructions for fading out a portion of the video data that is being rendered in the predetermined area of the display of the HMD while maintaining the view of the virtual world in an area of the display outside the predetermined area; and
        program instructions for fading in a portion of an image of a real world in the predetermined area, wherein the image of the real world is captured by a forward facing camera of the HMD and the portion of the image of the real world corresponds to a direction of the gaze of the user, the fading in simulating a see-through mode of the display in the predetermined area by extending a view of the user through the HMD into the real world in the direction of the gaze, while the area outside of the predetermined area continues to present the view of the virtual world,
wherein the fading out of the video data and the fading in of the image of the real world is performed for a period of time.

17. The computer program as recited in claim 16, wherein the predetermined area is one of an area defined below the display, an area defined to a side of the display, an area defined above the display, or an area defined on a corner of the display.

18. The computer program as recited in claim 16, wherein the predetermined area is defined below the display, and wherein the region is a bottom half of the display.

19. The computer program as recited in claim 16, further including:
    program instructions for detecting a command from the user to terminate the view of the real world;
    program instructions for fading out the view of the real world in the region; and
    program instructions for fading in a view of the virtual world in the region.

20. The computer program as recited in claim 16, wherein program instructions for tracking the gaze further includes:
    program instructions for capturing images of eyes of the user with a camera inside the HMD; and
    program instructions for analyzing the captured images to determine the gaze of the user.

21. A method for managing display of images on a head mounted device (HMD), the method comprising:
    notifying a user wearing the HMD to enter a signature by moving a gaze of the user in an empty area of the display;
    tracking the gaze of the user as the gaze of the user moves across the empty area of the display of the HMD;
    identifying a trajectory of the gaze as the gaze is tracked;
    comparing the identified trajectory to a signature for the user, the signature including a signature trajectory for gaze; and
    enabling access to a resource on the HMD when the identified trajectory corresponds to the signature trajectory, wherein accessing the resource causes images provided by the resource to be forwarded to the HMD for rendering on the display.

* * * * *